United States Patent
Shan et al.

(10) Patent No.: US 9,516,507 B2
(45) Date of Patent: Dec. 6, 2016

(54) APPARATUS AND METHODS OF ENHANCERS FOR LOW POWER NODES IN WIRELESS COMMUNICATION

(75) Inventors: Cheng Shan, Suwon-si (KR); Joon Young Cho, Suwon-si (KR); Youn Sun Kim, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 685 days.

(21) Appl. No.: 13/208,790

(22) Filed: Aug. 12, 2011

(65) Prior Publication Data

US 2012/0040683 A1  Feb. 16, 2012

Related U.S. Application Data

(60) Provisional application No. 61/373,038, filed on Aug. 12, 2010.

(51) Int. Cl.
*H04W 72/04* (2009.01)
*H04W 16/14* (2009.01)

(52) U.S. Cl.
CPC ............................... *H04W 16/14* (2013.01)

(58) Field of Classification Search
CPC ........................................................ H04W 16/14
USPC . 455/450–455, 464, 509–514; 370/329–337, 341, 431–463
See application file for complete search history.

(56) References Cited

U.S. PATENT DOCUMENTS

| | | | | |
|---|---|---|---|---|
| 7,864,795 | B2* | 1/2011 | Barbaresi et al. | 370/459 |
| 2009/0047971 | A1* | 2/2009 | Fu | 455/450 |
| 2010/0034151 | A1* | 2/2010 | Alexiou et al. | 370/329 |
| 2010/0118827 | A1* | 5/2010 | Sundaresan et al. | 370/330 |
| 2010/0142471 | A1* | 6/2010 | Cheng et al. | 370/329 |
| 2010/0238884 | A1* | 9/2010 | Borran et al. | 370/329 |
| 2011/0081914 | A1* | 4/2011 | Lin et al. | 455/450 |

* cited by examiner

*Primary Examiner* — Kashif Siddiqui
(74) *Attorney, Agent, or Firm* — Jefferson IP Law, LLP

(57) ABSTRACT

An apparatus and method of communicating with a first plurality of nodes and a second plurality of nodes in wireless communication systems are provided. The apparatus includes a communication unit for receiving node information from the first plurality of nodes, and a controller for generating joint resource information based on the node information received from the first plurality of nodes, wherein the communication unit sends the joint resource information to the second plurality of nodes.

10 Claims, 4 Drawing Sheets

(a)

(b)

APPARATUS AND METHODS OF ENHANCERS FOR LOW POWER NODES IN WIRELESS COMMUNICATION

CROSS-REFERENCE TO RELATED APPLICATIONS

This application claims the benefit under 35 U.S.C. §119 (e) of a U.S. provisional patent application filed on Aug. 12, 2010 in the U.S. Patent and Trademark Office and assigned Ser. No. 61/373,038, the entire disclosure of which is hereby incorporated by reference.

BACKGROUND OF THE INVENTION

1. Field of the Invention

The present invention relates generally to a plurality of wireless communication systems, more particularly, to at least one first cellular communication system coexisting with at least one second communication system operating with a lower power in a same area, the said systems operate on the same frequency band. The first and second communication systems negotiate on the resource usage, including frequency, time, and transmit power to mitigate mutual interference and improve the overall system performance.

2. Description of the Related Art

FIG. 1 shows an exemplary layout of two heterogeneous networks operating on the same frequency bandwidth according to the related art. A typical Low Power Node (LPN) is a home eNB (HeNB), while we refer a High Power Node (HPN) as a macro eNB (MeNB), as defined in 3rd Generation Mobile System (3GPP) releases. Both HeNB and MeNB serve a plurality of user equipments (UEs) of its own respectively. The HeNB locate inside the coverage of MeNB. Though there is no direct interference link between the two eNBs, serious interference may occur when a MeNB-served UE (MUE) approaches the vicinity of HeNB. The typical interferences are from HeNB to MUE in the downlink, and from MUE to HeNB in the uplink.

Referring to FIG. 1 (a), the two eNB can exchange information through backhaul, or an interface defined as X2 in 3GPP. There have been mechanisms proposed for ICIC which can be applied in such inter-HPN-LPN interference control. In 3GPP release 8, relative narrowband transmit power (RNTP) indicating the per resource block (RB) transmission power, overload indication (OI) indicating the interference plus noise level per RB, and high interference indicator (HII) indicating future cell-edge UE uplink transmissions, are defined to be exchanged through X2 interface for ICIC.

It is also possible for the LPN and HPN to exchange resource management information over-the-air (OTA). FIG. 1 (b) illustrates an example where the MUE acts as a relay to deliver information between HeNB and MeNB.

SUMMARY OF THE INVENTION

Aspects of the present invention are to address at least the above-mentioned problems and/or disadvantages and to provide at least the advantages described below. Accordingly, an aspect of the present invention is to provide an apparatus and methods to exchange resource information between a first plurality of low-power nodes and a second plurality of high-power nodes.

To achieve the said objective, an enhancer is invented with connection to both plurality of LPNs and HPNs. The said enhancer and the first plurality of LPNs can be wired or wireless connected. The said enhancer and the second plurality of HPNs can be wired or wireless connected.

The enhancer is capable of: collecting local resource management information from the first plurality of LPNs, generating a joint resource management information for the plurality of LPNs, sending the joint information to the second plurality of HPNs, collecting local resource management information from the second plurality of LPNs, generating individual resource management information for each of the first plurality of LPNs based on the information collected from the first plurality of LPNs and/or the second plurality of HPNs.

Other aspects, advantages, and salient features of the invention will become apparent to those skilled in the art from the following detailed description, which, taken in conjunction with the annexed drawings, discloses exemplary embodiments of the invention.

BRIEF DESCRIPTIONS OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present invention focuses on a scenario when multiple Low Power Nodes (LPNs) are coexisting with one or multiple High Power Nodes (HPNs) on the same frequency spectrum. Serious interference may occur when a HPN-connected User Equipment (UE) approaches the vicinity of a LPN. The HPN and LPN must coordinate their resource managements, including time-frequency resource allocation, UE scheduling and respective power allocation, etc., to mitigate the interference. Information must be exchanged among the interfering HPNs and LPNs. The present invention proposes an enhancer which communicates with HPNs as an agent of LPNs, the said enhancer is also capable of managing the resource allocation for the connected LPNs.

Figure 1:
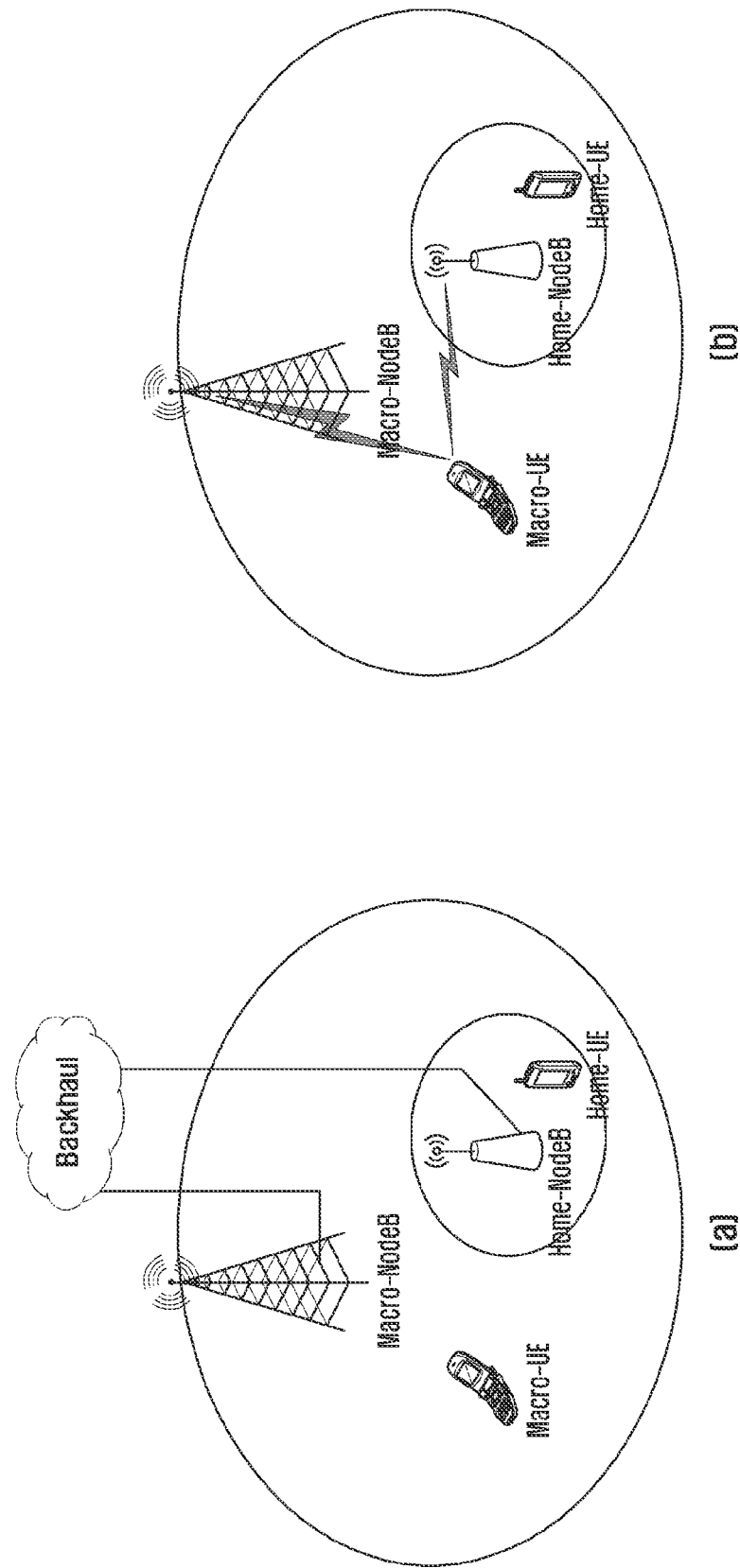
FIG. 1 illustrates an exemplary layout of two heterogeneous networks according to the related art.
Figure 2:
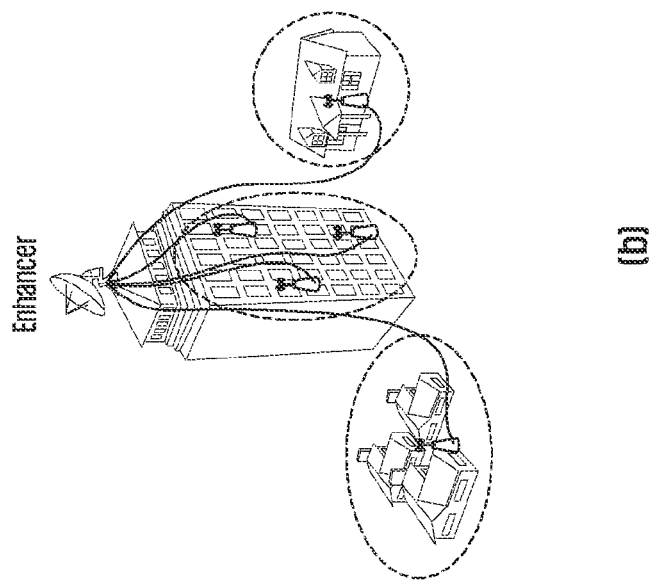
FIG. 2 illustrates two examples of an application of a proposed enhancer according to an exemplary embodiment of the present invention.
Figure 2:
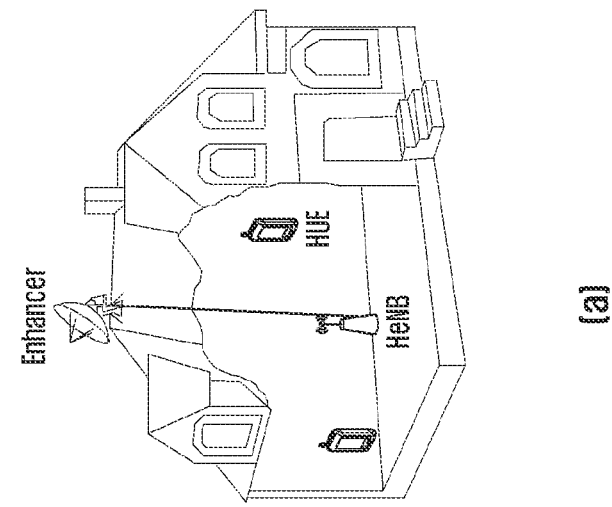
Figure 2:
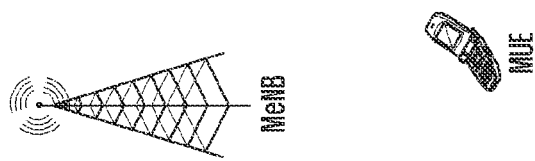

FIG. 2 illustrates two examples of an application of a proposed enhancer according to an exemplary embodiment of the present invention.

Referring to FIG. 2 (a), a stand-alone home-enhanced Node B (eNB) is deployed within the coverage of a macro-eNB. Severe interference may occur when a macro-UE approaches the home-eNB. Conventionally, the home-eNB should exchange resource allocation and interference level with the macro-eNB via X2 interface. When an enhancer is introduced, the said enhancer can be installed on the roof-top with wired connection with the home-eNB. In the example, the enhancer is equipped with a directional antenna pointing to the nearby macro-eNB. The scheduling and interference information can be exchanged between the enhancer and macro-eNB Over-The-Air (OTA), where the enhancer can access the macro-eNB as a special UE and the information is exchanged through higher layer messages in a preferred embodiment.

Referring to FIG. 2 (b), multiple small cells or LPNs can be deployed in a building, and there will be multiple home-eNB or pico-eNB nearby. All those nearby nodes can be connected to one local enhancer. All the LPNs send local scheduling and interference information to the enhancer, the enhancer will collect all the information and generate joint local scheduling and interference information. In another preferred embodiment, the LPNs may also report geo-location information so that the enhancer can calculate the local scheduling and interference level information more accurately. The enhancer exchanges the local information with the designated macro-eNB. If necessary, the enhancer should be communicating with multiple nearby macro-eNBs. The enhancer should generate individual local external scheduling and interference level information and send to each of the connected LPNs based on their types and locations, etc.

Figure 3:
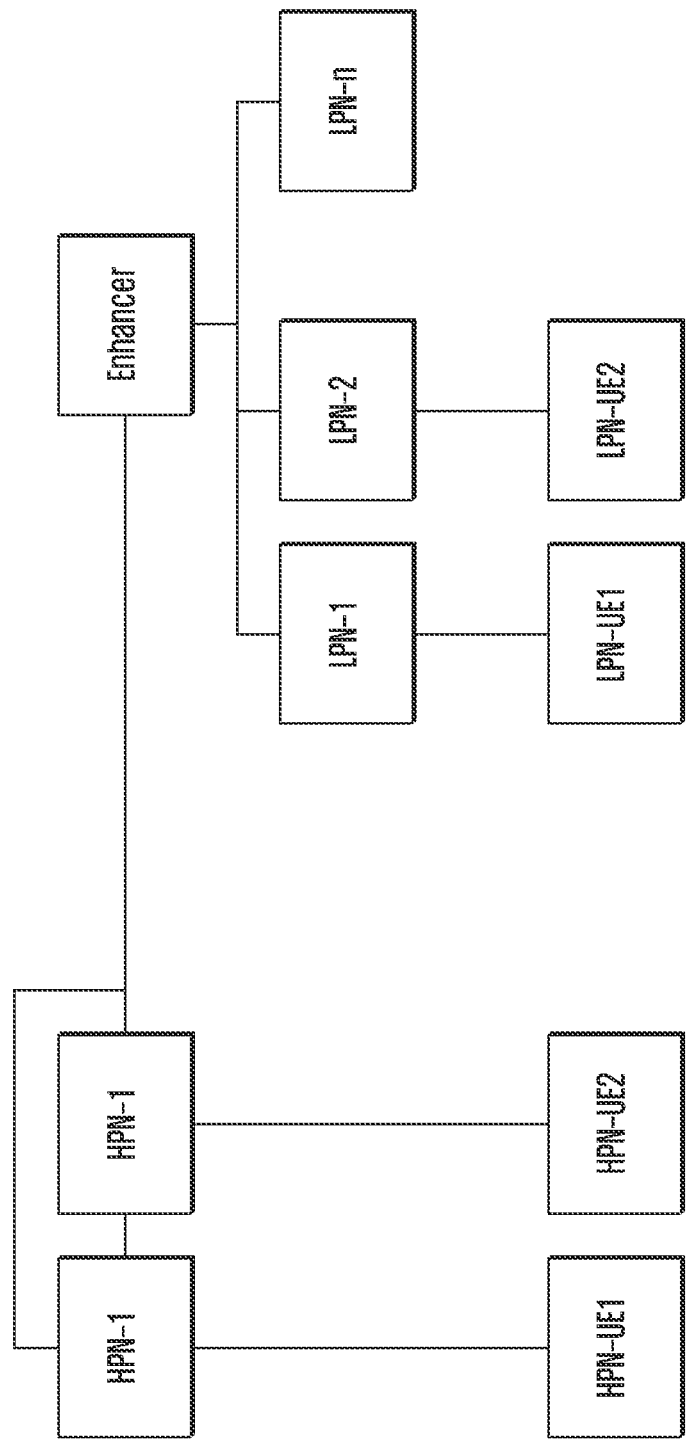
FIG. 3 illustrates an infrastructure of a proposed enhancer in a wireless communication system according to an exemplary embodiment of the present invention.

FIG. 3 illustrates an infrastructure of a proposed enhancer in a wireless communication system, where an enhancer is connected to multiple LPNs, as well as to one or multiple HPNs, according to an exemplary embodiment of the present invention. The connections could be wired, wireless, or virtual connection based on another protocol. In the system infrastructure, the enhancer is operating on top of the LPNs as a controller or gateway; it is also parallel to HPNs and capable of direct information exchange.

Figure 4:
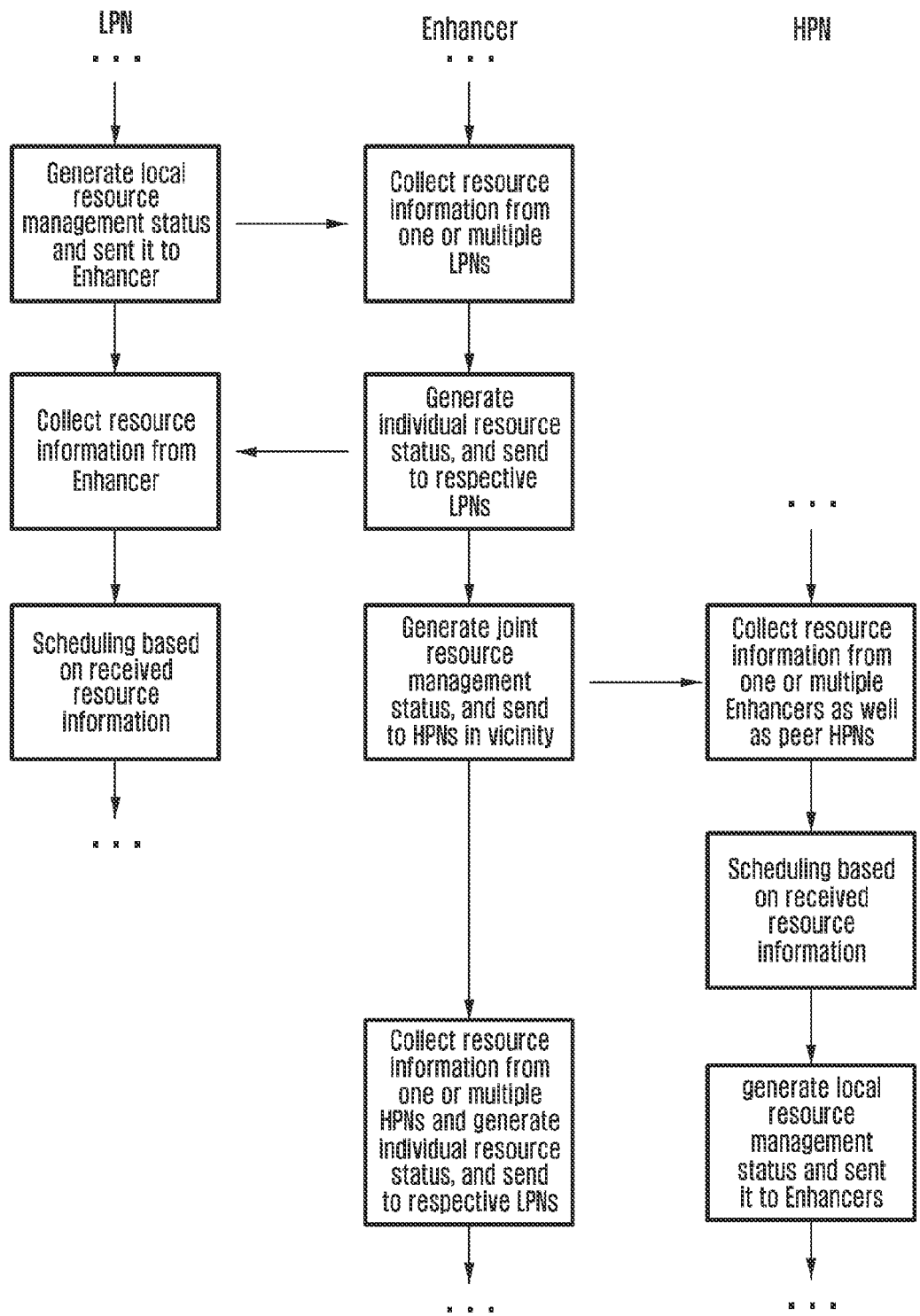
FIG. 4 illustrates exemplary working flows of LPN, HPN and an enhancer according to an exemplary embodiment of the present invention.

FIG. 4 illustrates exemplary working flows of LPN, HPN and an enhancer, where LPNs and HPNs can work independently and can coordinate resource scheduling through information exchange via the enhancer, according to an exemplary embodiment of the present invention. The individual procedures of LPN, HPN and enhancer can be described below:

The LPN generates its local report including node information of the LPN and sends it to the enhancer. The node information of the LPN may include the conventional Overload Indication (OI) and High Interference Indicator (HII) indications as in 3GPP release 8, as well as additional report such as geo-location information, antenna deployment information, local traffic load information, and more specific local resource scheduling information such as precoding matrix, etc., to facilitate the enhancer for joint information generation and local resource scheduling.

The LPN also receives the messages including resource information from the enhancer; the resource information may include the conventional OI and HII from external nodes as in 3GPP release 8, as well as additional messages such as resource allocation indication from the enhancer. The LPN schedule its transmission by taking all or a portion of the messages received into account.

The LPN may comprise a communication unit. The communication unit sends aforementioned messages to the enhancer and receives aforementioned messages from the enhancer.

The LPN may comprise a controller. The controller generates the node information of the LPN. Further, the controller may schedule transmission of the LPN by taking at least a portion of the messages received into account.

The HPN also receives the messages including resource information from the enhancer; the resource information may include the conventional OI and HII from external LPNs as in 3GPP release 8, as well as additional messages such as local deployment and scheduling information of the LPNs. The HPN schedule its transmission by taking all or a portion of the messages received into account.

The HPN generates its local report including node information and send it to the enhancer; the node information of the HPN may include the conventional OI and HII indications as in 3GPP release 8, as well as additional report such as geo-location information, antenna deployment information, local traffic load information, and more specific local resource scheduling information such as precoding matrix, etc. to facilitate the enhancer for local resource scheduling. The resource information may include joint resource information generated by the enhancer.

The HPN may comprise a communication unit. The communication unit sends aforementioned messages to the enhancer and receives aforementioned messages from the enhancer.

The HPN may comprise a controller. The controller generates the node information of the HPN. Further, the controller may schedule transmission of the HPN by taking at least a portion of the messages received into account.

The enhancer collects the reports including node information from the one or multiple connected LPNs as aforementioned in the LPN procedures; the enhancer then generate a joint resource information by taking all or a portion of the information accumulated for all the connected LPNs. The enhancer then sends this joint resource information to one or multiple HPNs; the said joint resource information may include the conventional OI and HII indications as in 3GPP release 8, as well as additional report such as geo-location information, local traffic load information, and more specific local resource scheduling information such as precoding matrix, etc. The enhancer may generate multiple joint resource information for multiple HPNs based on respective HPNs' node information such as geo-location.

The enhancer receives the message including node information from one or multiple HPNs as aforementioned in the HPN procedures.

The enhancer generates individual resource information for each of connected LPNs based on all or a portion of the node information collected from both LPNs and HPNs and the local node information of the respective individual LPNs. The individual oriented message may include the conventional OI and HII from external nodes as in 3GPP release 8, as well as additional messages such as resource allocation indication for each LPN.

The enhancer may comprise a communication unit. The communication unit sends aforementioned messages to the LPN and the HPN. Further, the communication unit receives aforementioned messages from the LPN and the HPN.

The enhancer may comprise a controller. The controller collects resource information and generates joint resource information. The controller may generate individual resource information for the LPN.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus capable of communication with a first plurality of nodes and a second plurality of nodes, the apparatus comprising:
    a communication unit; and
    a controller configured to:
        control the communication unit to receive first node information from the first plurality of nodes and second node information from the second plurality of nodes,
        generate joint resource information based on the first node information,
        generate individual resource information for each of the first plurality of nodes based on the first node information and the second node information, and
        control the communication unit to transmit the joint resource information to the second plurality of nodes and the individual resource information to each of the first plurality of nodes.

2. The apparatus according to claim 1, wherein the second plurality of nodes schedule a transmission according to the joint resource information.

3. The apparatus according to claim 1, wherein the first node information comprises at least one of a channel status of each of the first plurality of nodes, and scheduling information of each of the first plurality of nodes.

4. A method for resource allocation of an apparatus capable of communication with a first plurality of nodes and a second plurality of nodes, the method comprising:
    receiving first node information from the first plurality of nodes and second node information from the second plurality of nodes;
    generating joint resource information based on the first node information;
    transmitting the joint resource information to the second plurality of nodes;
    generating individual resource information for each of the first plurality of nodes based on the first node information and the second node information; and
    sending the individual resource information to each of the first plurality of nodes.

5. The method according to claim 4, wherein the second plurality of nodes schedule a transmission according to the joint resource information.

6. The method according to claim 4, wherein the first node information comprises at least one of a channel status of each of the first plurality of nodes, and scheduling information of each of the first plurality of nodes.

7. A node for scheduling a transmission, the node comprising:
    a communication unit, and
    a controller configured to:
        control the communication unit to receive joint resource information for a first plurality of nodes and individual resource information for each of the first plurality of nodes,
        control the communication unit to transmit node information to a node associated with a second plurality of nodes, and
        schedule a transmission of the node according to the joint resource information and the individual resource information,
    wherein the individual resource information for each of the first plurality of nodes is generated based on first node information of the first plurality of nodes and second node information of the second plurality of nodes.

8. The node according to claim 7,
    wherein the joint resource information is generated based on the first node information of the plurality of first nodes, and
    wherein a type of the plurality of second nodes is different from a type of the first plurality of nodes.

9. A method for scheduling a transmission, the method comprising:
    receiving joint resource information of a first plurality of nodes and individual resource information for each of the first plurality of nodes; and
    scheduling a transmission by a node associated with the first plurality of nodes based on the joint resource information and the individual resource information,
    wherein the individual resource information for each of the first plurality of nodes is generated based on first node information of the first plurality of nodes and second node information of the second plurality of nodes.

10. The method according to claim 9,
    wherein the joint resource information is generated based on the first node information of the first plurality of nodes, and
    wherein a type of the first plurality of nodes is different than a type of the second plurality of nodes.

* * * * *